United States Patent [19]

Peters

[11] 4,056,466

[45] Nov. 1, 1977

[54] METHOD OF DEWATERING MATERIAL CONTAINING SOLID MATTER AND BOUND AND UNBOUND WATER

[75] Inventor: Hans H. Peters, Federal Way, Wash.

[73] Assignee: Resources Conservation Co., Renton, Wash.

[21] Appl. No.: 385,488

[22] Filed: Aug. 3, 1973

[51] Int. Cl.² .................................... B01D 11/00
[52] U.S. Cl. ........................... 210/10; 210/22 R; 210/59; 210/67
[58] Field of Search ............... 23/312 A, 312 W; 210/10, 21, 22, 43, 56, 59, 71, 67

[56] References Cited

U.S. PATENT DOCUMENTS

| 2,967,825 | 1/1961 | Baniel | 210/21 |
| 3,088,909 | 5/1963 | Davison et al. | 210/22 |
| 3,365,395 | 1/1968 | McDonald | 210/21 |

OTHER PUBLICATIONS

Zeitoun et al., "Solvent Extraction of Secondary Waste Water Effluents," WPCFJ, Apr. 1966, pp. 544–554.
Merck Index, 6th Edition, 1952, p. 972.

*Primary Examiner*—Wilbur L. Bascomb, Jr.
*Assistant Examiner*—Peter A. Hruskoci
*Attorney, Agent, or Firm*—Bacon & Thomas

[57] ABSTRACT

A sludge, or other material containing solid matter and bound and unbound water, is dewatered by admixing the sludge with an amine having an inverse critical solution point with water, always maintaining the temperature of the resulting slurry below the inverse critical solution temperature, and thereafter separating the solid matter from the resulting single phase liquid. The single phase liquid is then heated to a temperature above the inverse critical solution point to form an amine phase and a water phase, after which the water phase is separated from the amine phase. The liquid-solid separation rate is significantly increased by preventing the slurry temperature from rising above the inverse critical solution temperature during mixing and separation.

7 Claims, 1 Drawing Figure

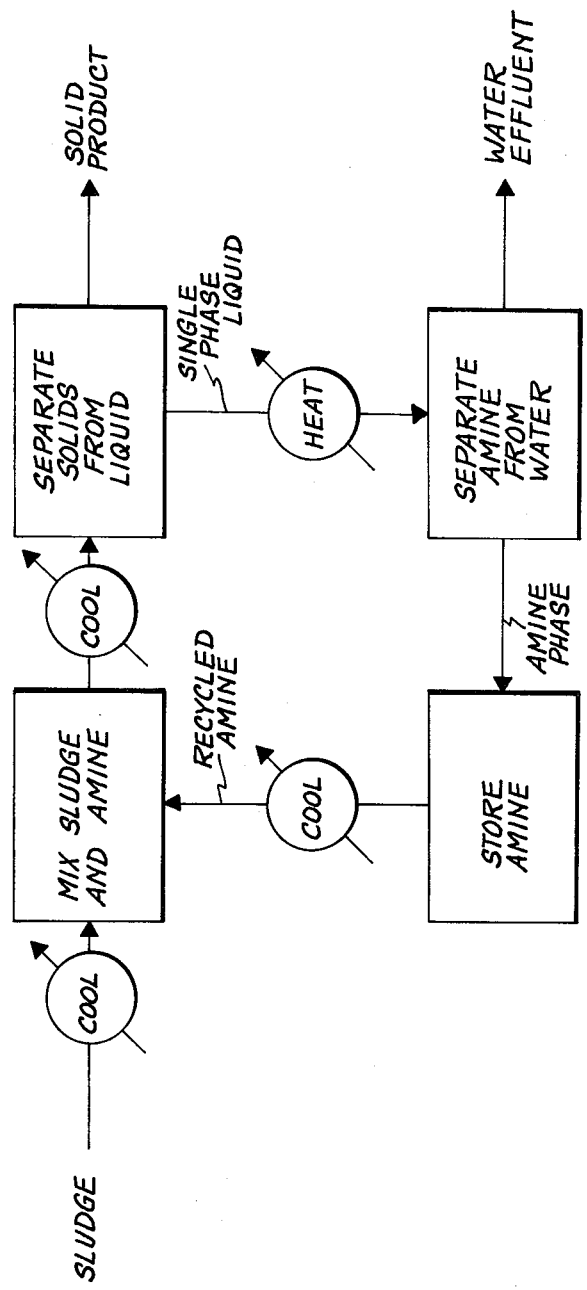

METHOD OF DEWATERING MATERIAL CONTAINING SOLID MATTER AND BOUND AND UNBOUND WATER

BACKGROUND OF THE INVENTION

This invention relates to an improved method for dewatering material containing solid matter and bound and unbound water by combining the material with a secondary or tertiary amine having an inverse critical solution point with water, adjusting the temperature of the material and the amine to below the inverse critical solution temperature, and separating the solid matter from the resulting single phase liquid. More particularly, the invention relates to a method by which the separation rate of the solid matter from the single phase liquid can be increased.

The basic method for separating water from a material containing solid matter and bound and unbound water on which the present invention is based is described and claimed in a copending application, given Ser. No. 288,872, filed Sept. 13, 1972, now abandoned and refiled as a Continuation under Ser. No. 481,757 on June 21, 1974 now U.S. Pat. No. 3,899,419 assigned to the assignee hereof, and expressly incorporated herein by the reference. As disclosed in the aforementioned application, the material to be dewatered is mixed with an amine or mixture of amines, which exhibits an inverse critical solution point with water. The temperature of the resulting mixture is then lowered below the inverse critical solution temperature, below which temperature the amine and the water present in the solid material become miscible and form a single phase liquid. Other compositions which may be present in the original material and which are soluble in water or in the amine are also solubilized in the single phase liquid. The liquid and solid components of the mixture are then mechanically separated to yield a solid phase containing substantially all of the said matter from the original material and a single phase liquid fraction comprising the amine and the water from the original material. The solid fraction is then processed further as desired.

The single phase liquid is then heated to a temperature above the critical solution temperature, thereby forming a two-phase liquid system comprising a water phase with a small amount of amine dissolved therein and an amine phase with a small amount of water dissolved therein. The water phase is then processed further as desired. The amine phase can be recycled, if desired, for admixture with additional solid matter containing unbound and bound water.

As defined in the aforementioned application and as used herein, the term sludge refers to an original starting material to be dewatered. A sludge contains solid matter in particulate or finely divided form in combination with water in either bound or unbound form. A typical sludge, such as sewage sludge, also contains materials other than particulate matter and water, for example, fats and oils. The term slurry is used herein to refer to the mixture of the starting material and the amine.

The term bound water as used herein is that water in solid matter which exerts a vapor pressure less than that of pure water at a given pressure and temperature. The water may become bound by retention in small capillaries in the solid matter, by solution in cell or fiber walls, by homogeneous solution throughout the solid, or by physical absorption on solid surfaces. The term bound water includes hydrated water, water of crystallization, and water which is bound by ionic bonds to solid matter. An example of the latter type of bound water is that which is bound to proteinaceous material by hydrogen bonds. In addition, bound water can include that water which is retained in a biocell mass, either on or inside the cell wall. The term unbound water as used herein is that water in excess of the equilibrium water content in the solid matter corresponding to saturation humidity. Water which is bound or unbound can be removed by the foregoing dewatering method.

In accord with the foregoing method the dewatering solvent, a secondary or tertiary amine as defined below, is one which exhibits an inverse critical solution point in a two-phase system with water. The most preferred amines are those which exhibit an inverse critical solution point at or near atmospheric pressure and prevailing ambient temperatures. Below the inverse critical solution point the water and the amine are completely miscible in all proportions. Above the inverse critical solution point the amine and water will separate into two distinct phases, one phase being primarily amine with a small amount of water in solution therewith and the other phase being primarily water with a small amount of amine dissolved therein.

As set forth in the aforementioned copending application and for purposes of the present invention, the preferred class of amines are those which comprise a member of or mixtures of members of the group having the formula

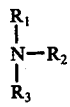

wherein $R_1$ can be hydrogen or alkyl, wherein $R_2$ and $R_3$ can be independently selected from alkyl radicals having from one to six carbon atoms or alkenyl radicals having from two to six carbon atoms, wherein the total number of carbon atoms in the amine molecule can be in the range of from three to seven inclusive, and wherein the amine exhibits an inverse critical solution temperature in a two-phase system with water. Triethylamine is the most preferred of the foregoing class of amines because of its cost and its lack of polar solvent attraction. Triethylamine exhibits an inverse critical solution point at a pressure of 760 millimeters of mercury and a temperature of approximately 18.7° C. (approximately 66° F.). These data on the inverse critical solution point are approximations, relating the best available data at this time.

It is to be understood that the inverse critical solution temperature may be slightly affected by the presence of salts, compositions soluble in the amine or water, and insoluble particulate or solid matter. For any given liquid-solid system within the pervue of this invention, however, there is a predeterminable temperature below which the water and the amine will become completely miscible.

Although the foregoing process is effective for dewatering sludges of all types, a low rate of separation of the solid matter from many slurries containing different types of sludges has been observed. Accordingly, it is a broad object of the present invention to reduce the time required to separate solid matter from a slurry containing a sludge in admixture with an amine of the foregoing class and thereby increase the liquid-solid separation rate.

SUMMARY OF THE INVENTION

The foregoing broad object and other objects which will become apparent to one of ordinary skill in the art after reading the following specification are achieved by always maintaining the temperature of the slurry below the inverse critical solution temperature, both while mixing the amine and a sludge and while separating the solid matter from the resulting single phase liquid. A particularly advantageous method for accomplishing the desired result is to precool both the amine and the sludge to a temperature sufficiently low to prevent the temperature of the resulting mixture from rising above the inverse critical solution temperature.

BRIEF DESCRIPTION OF THE DRAWINGS

The accompanying drawing is a flow diagram representing the several process steps which are performed in accord with the present invention to dewater a sludge. The process is initiated by precooling the sludge and the amine prior to admixture thereof. The process yields a dewatered solid product, a recyclable amine and a waste water effluent.

DESCRIPTION OF THE PREFERRED EMBODIMENT

In accord with the present invention an amine selected from the foregoing class, for example triethylamine, is removed from storage and cooled to a temperature below its inverse critical solution temperature. At the same time a sludge to be dewatered, for example a sewage sludge, is cooled to a temperature below the inverse critical solution temperature of the selected amine. The sludge and the amine are then combined and thoroughly mixed using conventional techniques and apparatus to assure complete contact between the amine and the water in the sludge.

The heat of solution of the amine and water is positive. Thus upon mixing a sufficient amount of heat is generated to cause the temperature of the resulting slurry to rise. Care must be taken in accord with this invention to prevent the temperature of the slurry from exceeding the inverse critical solution temperature. From a process economics standpoint it is preferred that the temperature to which one or both of the amine and the sludge are precooled is chosen sufficiently low so that the exothermic dissolution reaction will not heat the slurry above the inverse critical solution temperature. Alternatively or in combination with the foregoing, the slurry can be cooled as it is formed at a rate equal to or exceeding the rate at which heat is generated by the dissolution reaction.

Typically the preferred amine, triethylamine, is mixed with sewage sludge in a volume ratio of three parts of amine to one part of sludge. For these proportions and assuming an ambient temperature less than 75° F., precooling both the amine and the sludge to a temperature on the order of 25° F. below the inverse critical solution temperature will prevent the slurry temperature from rising above the inverse critical solution temperature.

The solid matter is suspended in the slurry in a finely divided, loosely agglomerated form. If the slurry temperature exceeds the inverse critical solution temperature, the particles apparently tend to attract to bind water thereto, resulting in a high liquid-solid separation time. To obtain a good particle distribution and to maintain a low interparticle attraction level, it is preferred that the slurry temperature be maintained less than about 3° F. below the critical solution temperature. Good results have been obtained by maintaining the slurry temperature during mixing between about 3° F. to 8° F. below the inverse critical solution temperature.

Preparatory to separation the slurry is further cooled to a temperature on the order of 25° F. below the inverse critical solution temperature. Best results have been obtained by maintaining the temperature of the slurry in the range of about 23° F. to about 28° F. below the inverse critical solution temperature. The solid matter is then separated from the liquid by conventional solid-liquid separation techniques such as centrifugation or filtration. When the temperature of the slurry is maintained below the inverse critical solution temperature as described above, the liquid-solid separation times can be reduced by a factor of 50% or greater. The reduction in separation time provides a more economical overall process by lowering the process flow time and reducing the energy input required for separation.

The solid matter derived from the separation step can then be further processed. For example, it can be forwarded to a heating zone where any residual liquid can be driven off prior to disposal. Thereafter the single phase liquid derived from the separation step is heated to a temperature above the inverse critical solution temperature, causing separation of the single phase liquid into an amine phase and a water phase. The two liquid phases are then separated by conventional methods such as decantation. The water effluent is then further processed prior to discharging it. The amine phase can be recycled to a storage zone and after cooling can be recycled for admixture with additional sludge.

The method of the present invention operates effectively to separate solid matter from both organic and inorganic sludges. Examples of organic sludges are aerobic and anaerobic sewage sludges obtained from sewage treatment processes. An aerobic (or activated) sewage sludge as used herein is the settled product taken from an aerated settling basin in a sewage treatment facility. This aerobic sludge contains a variety of organic and inorganic materials in solution with and suspension in water. Normally, the solids content of an activated sludge is on the order of 0.7% by weight to 1.5% by weight. An anaerobic sewage sludge is one which is taken from an anaerobic digester in a sewage treatment plant. Frequently an activated sludge and primary settled sludge from raw sewage are placed in an anaerobic digester to break down the sludge into a relatively innocuous mass. The anaeorbic sludge derived from the digester normally contains on the order of 2% to 7% by weight solids based on the sludge. An example of an inorganic sludge on which the process of the present invention is particularly efficacious is a hydrated alum sludge which is produced as a waste product from potable water treatment processes. Other sludges, including fish waste, green plant waste and many other materials containing bound and unbound water, can also be dewatered by the foregoing method.

The following examples are set forth to better enable one of ordinary skill in the art to reproduce the invention as described above. These examples are intended to be illustrative and are not intended in any manner to limit the invention described and claimed herein.

EXAMPLE I

A first control separation is conducted by placing 100 ml. (approximately 100 g.) of a sludge from an anaerobic digester in a 500 ml. beaker. The sludge is cooled to a temperature of 42° F. 300 ml. of triethylamine is cooled to a temperature of 36° F. and added to the beaker to form a slurry. The slurry is vigorously mixed. The dissolution reaction is exothermic causing the temperature of the slurry to rise to about 66° F., the inverse critical solution temperature of pure triethylamine in water. The beaker and its contents are then placed in a chiller and cooled to a temperature of about 54° F., while stirring periodically. A 4 inches Buchner funnel having a Whatman No. 3 filter paper positioned in the bottom thereof is placed in a one liter vacuum flask. The contents of the beaker are poured into the Buchner funnel. A vacuum measuring between about 6 psi and 10 psi absolute is drawn on the flask. The filtration time is greater than 10 minutes. The end of the filtration time period occurs when the liquid disappears from the top of the filter cake.

EXAMPLE II

The procedure of EXAMPLE I is repeated, first pretreating the sludge by thoroughly mixing 1 ml. of 0.2N NaOH with the sludge prior to combining it with the amine. The amine and sludge are precooled to 41° F. and 56° F., respectively. The temperature of the resulting slurry is 68° F. The filtration temperature is 34° F. The filtration time is greater than 10 minutes.

EXAMPLE III

The procedure of EXAMPLE I is repeated. The temperature of the slurry resulting from the mixture of precooled amine and sludge is 45° F. The filtration temperature is 28° F. The filtration time is 3 minutes and 30 seconds.

EXAMPLE IV

The procedure of EXAMPLE I is repeated. The sludge and the amine are both precooled to 35° F. The temperature of the resulting slurry is 61° F. The filtration temperature is 41° F. The filtration time is 4 minutes and 10 seconds.

EXAMPLE V

The procedure of EXAMPLE II is repeated. The temperature of the slurry resulting from the mixture of precooled amine and sludge is 58° F. The filtration temperature is 34° F. The filtration time is 4 minutes and 10 seconds.

As can be observed by contrasting EXAMPLES I and II with EXAMPLES III, IV and V, filtration time is substantially decreased when the slurry temperature is not allowed to rise above the inverse critical solution temperature of triethylamine in water. The filtration time under the latter conditions is less than half of the filtration time when the slurry temperature equals or rises above the inverse critical solution temperature. By employing the simple processing step of always maintaining the slurry (during mixing, in transit to separation and during separation) below the inverse critical solution temperature of the chosen amine, a significant reduction in overall process time can be effected. In so doing the amount of sludge which can be dewatered with a given installation using the improved process disclosed herein can be increased. Concomitantly, the energy requirements of the process on a unit flow basis are reduced.

The present invention has been described in relation to a preferred embodiment in which triethylamine is employed as the dewatering solvent. All of the secondary and tertiary amines of the class described above can be used with the improved process disclosed herein. Although specific examples of the operation of the process on sewage sludge have been given, the process will effect a reduction in liquid-solid separation time for other sludges as well. It is to be understood that the one of ordinary skill in the art, once understanding the invention, will be able to make various changes in the process steps and will be able to substitute equivalent materials without departing from the overall concept disclosed herein. It is therefore intended that the present invention be limited only by the definition contained in the appended claims and the equivalents thereof.

What is claimed is:

1. In the process for dewatering a sludge containing solid matter and water including the steps of
   admixing said sludge with an amine to form a mixture, said amine having the formula

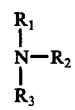

wherein:
   $R_1$ is hydrogen or alkyl,
   $R_2$ and $R_3$ are alkyl radicals having from one to six carbon atoms or alkenyl radicals having from two to six carbon atoms, and
   the total number of carbon atoms in the molecule being in the range of from three to seven, inclusive, said amine having an inverse critical solution temperature in a two phase system with water,
   adjusting the temperature of said mixture below said inverse critical solution temperature to form a single phase liquid and a solid phase containing at least a portion of said solid matter which is insoluble in said single phase liquid, and
   separating said solid phase from said single phase liquid, the improvement comprising:
   maintaining the temperature of said mixture below said inverse critical solution temperature while admixing said amine and said sludge and until said solid phase is separated from said single phase liquid.

2. The process of claim 1 wherein the temperature of said mixture is maintained below said inverse critical solution temperature by precooling said sludge and said amine below said inverse critical solution temperature prior to admixture thereof.

3. The process of claim 2 wherein the temperature of said mixture is maintained at least about 3° F. below said inverse critical solution temperature.

4. The process of claim 3 wherein the temperature of said mixture is maintained from about 3° F. to about 8° F. below said inverse critical solution temperature.

5. The process of claim 4 wherein said sludge is an anaerobic sewage sludge.

6. The process of claim 5 wherein said mixture is adjusted to about 23° F. to 28° F. below said inverse critical solution temperature prior to separating said solid matter from said single phase liquid.

7. The process of claim 4 wherein said sludge is an activated sewage sludge.

* * * * *